United States Patent [19]

Gilmore et al.

[11] 4,208,444

[45] Jun. 17, 1980

[54] WHIPPABLE TOPPING MIX

[75] Inventors: Cecilia Gilmore; Donald E. Miller, both of Strongsville, Ohio

[73] Assignee: SCM Corporation, New York, N.Y.

[21] Appl. No.: 855,879

[22] Filed: Nov. 30, 1977

[51] Int. Cl.² ............................................. A23J 3/02
[52] U.S. Cl. .................................... 426/570; 426/804
[58] Field of Search .................. 426/98, 99, 103, 564, 426/568, 570, 804

[56] References Cited

U.S. PATENT DOCUMENTS

| | | |
|---|---|---|
| 3,495,990 | 2/1970 | Kayser ................................. 426/570 |
| 3,702,254 | 11/1972 | Cassanelli et al. ................... 426/564 |
| 3,787,216 | 1/1974 | Wingerd et al. ..................... 426/570 |
| 3,928,648 | 12/1975 | Stahl et al. .......................... 426/564 |
| 3,944,680 | 3/1976 | Van Pelt et al. ..................... 426/564 |

Primary Examiner—Jeanette M. Hunter
Attorney, Agent, or Firm—Richard H. Thomas

[57] ABSTRACT

There is disclosed a low-calorie whippable topping composition which comprises a protein, a stabilizing gum, a sweetener, an emulsifier, and a fat wherein the fat is a high solids fat such as hydrogenated palm kernel oil and the fat and emulsifier are present in relatively low proportions.

6 Claims, No Drawings

WHIPPABLE TOPPING MIX

The present invention relates to a novel whippable topping composition having significantly less fat and emulsifier than conventionally employed, by which the caloric content is substantially reduced without corresponding loss of desirable properties. The present invention relates to both dried mix compositions, capable of reconstitution by admixture with water or milk, and liquid compositions purchasable in either the frozen or the liquid state.

BACKGROUND OF THE INVENTION

Whippable compositions capable of being whipped into fluffy toppings for desserts, salads and the like, either with mechanical mixers or by hand, are presently available on the market, as either dry mixes capable of reconstitution with water and milk, as liquid mixes capable of direct use, or as frozen mixes which require thawing prior to whipping. In addition to flavor and eating qualities of the whipped topping compositions, properties desired of the whipped topping compositions are foam stability or firmness (i.e., the ability to hold shape); ease of reconstitution or mixing with water, in the case of dry mixes; acceptable whipping time; and acceptable overrun (the amount of air introduced into the composition during whipping).

Generally speaking the whippable compositions on the market today have high caloric content due to the presence of both large amounts of lipid material and large amounts of sugar or sweetener. Attempts have been made to reduce the caloric content by replacing the sugar in whole or in part with an artificial sweetener. However, it is possible that such artificial sweeteners will be banned from use as food additives.

By the present invention, it was discovered that the caloric content could be significantly reduced by reduction in the fat and emulsifier contents. At the same time, the novel compositions of the present invention retain the properties conventionally desired of whippable topping compositions.

Typically, the lipid content of whippable compositions is about 24-28% (about 50 to 60% on a dry basis). U.S. Pat. No. 2,913,342, to Cameron et al, describes a whipped topping composition suitable for spray drying and reconstitution with milk. The product which is spray dried comprises cottonseed oil, propylene glycol monostearate, lecithin, sucrose, non-fat milk solids and water. The cottonseed oil content on a dry weight basis is about 36%, the composition also having about 13% emulsifiers.

A similar disclosure is contained in prior U.S. Pat. No. 3,098,748, to Noznick et al. The composition in this patent contains 40 to 60% fat, 0 to 10% mono- and diglycerides, 0 to 10% of what is called a whipping agent, 5 to 35% sweetener, 1 to 15% protein and other ingredients, on a dry basis.

Prior U.S. Pat. No. 3,224,883, to Pader et al, describes an aerosol topping dispensable from a pressurized container, in the form of an aqueous emulsion. The composition disclosed in this patent is also typical of high fat, high calorie toppings, comprising about 26 to 30% fat and emulsifier (on a wet basis). One particular composition disclosed in this patent contains about 30% base fat, 0.6% emulsifier, 10.5% sucrose, 0.3% sodium caseinate, 0 to 0.2% carboxymethyl cellulose, and other ingredients, the remainder being water.

Other representative patents are U.S. Pat. Nos. 3,423,211, to Miles, Jr. et al, describing a dry whippable topping mix containing about 40% fat and emulsifier on a dry basis; and 3,560,220, to Bangert et al, disclosing the use of about 50% fat and emulsifier, also on a dry basis.

Prior U.S. Pat. No. 3,806,605, to Patterson, discloses a whippable composition which is described as a low fat whipped topping capable of undergoing repeated freezing and thawing cycles without adverse effects. The composition of this patent comprises 10 to 15% by weight of a low melting edible vegetable glyceride fat, 2 to 5% of a higher melting edible vegetable glyceride fat, 0.4 to 0.65% of a mixture of lactylic esters of fatty acids and mono- and diglycerides of fatty acids, 0.25 to 0.40% of sorbitan monostearate, and other ingredients. Contrasted with the compositions of the present invention, the composition of this patent can still be characterized as having a high fat content.

SUMMARY OF THE PRESENT INVENTION

The present invention resides in the discovery of a novel whippable topping composition that has a fat content, on a liquid basis, in the range of about 8-10% giving a total caloric content of about 170-180 calories per 100 grams, which composition at the same time provides the desirable attributes required of conventional whippable topping compositions. In particular, the composition of the present invention has good flavor and eating qualities; good foam stability; good overrun, defined as the ability to incorporate air up to 150-300% of the composition initial volume; and good whipping time defined as the ability to whip to the desired consistency or density, using a household type mixer, in 5 to 10 minutes. The composition of the present invention also has good freeze-thaw stability, that is, wherein the composition, following thawing from a frozen state, provides a stable emulsion. Additional ingredients employed comprise an edible protein, a stabilizing gum, a sweetener, and an emulsifier in amounts sufficient to render the composition whippable, defined as proportions sufficient to obtain a stable foam with good overrun.

In a preferred embodiment, the whippable topping composition of the present invention comprises, on a liquid basis: about 8-10% high solids fat; about 1-5% of an edible protein; about 0.20-2.2% of a stabilizing gum; about 15-25% of a sweetener; and about 0.1-1.2% emulsifier.

It is important that the fat of the present invention be a high solids fat preferably having a high lauric acid content. Suitable such fats are hydrogenated palm kernel oil having a lauric acid content of about 49.6%; hydrogenated coconut oil having a lauric acid content of about 48.5%; and hydrogenated Tucum oil having a lauric acid content of about 51.8%. Preferably such oil should have a Wiley Melting Point in the range of about 90° F. to about 115° F. and an approximate Solid-Fat Index of:

| Temperature, °F. | Approximate Solid-Fat Index |
| --- | --- |
| 50 | 69± 10 |
| 70 | 60± 12 |
| 80 | 39 ± 14 |
| 92 | 14 ± 8 |

| Temperature, °F. | Approximate Solid-Fat Index |
|---|---|
| 100 | 11 max. |

A preferred fat useful in the composition of the present invention is Paramount C (trademark, SCM Corporation) having a Wiley Melting Point of 101° to 103° F. and a Solid-Fat Index of:

| Temperatrure, °F. | Approximate Solid-Fat Index |
|---|---|
| 50 | 66 |
| 70 | 53 |
| 80 | 38 |
| 92 | 13 |
| 100 | 4.5 (max.) |
| 110 | 0 |

Hydrogenated palm kernel oil, useful in the composition of the present invention, has a Wiley Melting Point of 111° F. and a Solid-Fat Index of:

| Temperature, °F. | Approximate Solid-Fat Index |
|---|---|
| 50 | 73.0 |
| 70 | 64.0 |
| 80 | 47.0 |
| 92 | 17.0 |
| 100 | 7.7 |

The fat should have an iodine value not substantially greater than about 5. Hydrogenated coconut oil, hydrogenated Tucum oil, hydrogenated palm kernel oil and Paramount C useful in the present invention have I.V.'s less than about 5.

The sweetener employed in the composition of the present invention can be any of those conventionally used in the production of whipped topping compositions. Preferably a substantial portion of the sweetener is dry corn syrup solids to add bulk to the whippable topping composition, without excessive sweetness. One hundred percent of the sweetener can be dry corn syrup solids. One suitable dry corn syrup solids sweetener available on the market is Dri-Sweet 36, trademark, Hubinger Co., having a D.E. of 36. Sucrose and dextrose may be employed in combination with the dry corn syrup solids, for instance in the ratio up to about 3:1 of dry corn syrup solids to dextrose. Another suitable sweetener is Maltodextrin consisting of a mixture of dextrose, maltose and dextrin. The ratio of dry corn syrup solids to dextrose or other sweetener is not critical except with regard to level of sweetness and bulk desired.

Another important ingredient of the composition of the present invention is the stabilizing gum. Preferred such stabilizing gums are microcrystalline cellulose; guar gum; Irish moss (carrageenan); gum tragacanth; gum acacia; gum karaya; locust bean gum; sodium carboxymethyl cellulose; cellulose ethers such as methyl cellulose; low methoxy pectin; propylene glycol alginate; sodium alginate, and combinations of the above. One preferred stabilizer employed in the composition of the present invention is Avicel RC 581, trademark, FMC Corporation, which is a mixture of 89% cellulose gel (microcrystalline cellulose) and 11% cellulose gum (sodium carboxymethyl cellulose).

The purpose of the stabilizing gum is to offer bodying and water binding properties to the composition, and also to significantly improve the ability of the composition to withstand freezing and thawing without adverse effects. Starches such as rice, potato, corn, tapioca and pre-gelatinized starches could also be used to give improved bodying effect.

In a preferred embodiment of the present invention, a combination of gums is employed, namely Avicel RC 581 with a small amount of carrageenan. Both provide a water binding effect, reducing syneresis. Following techniques known in the art, an excessive amount of carrageenan is avoided as such an excessive amount would cause a liquid composition to set up. However, the use of a small amount of carrageenan or similar gum enhances the water binding effect. Alternatively, the desirable properties of the composition of the present invention can be achieved by use of 0.20-2.2% of a single gum, such as Dow Methocel (hydroxy propyl methyl cellulose).

The formulation of the present invention also employs a water-dispersible or soluble protein. Sodium caseinate is a preferred such protein, but any water-dispersible or soluble edible protein may be employed, such as soy protein, non-fat milk solids, whey solids, fish protein, calcium caseinate and cottonseed protein. Other suitable proteins are yeast proteins such as torula yeast "Torutein-94" (trademark, Amoco Foods Company).

The emulsifying agent in the composition of the present invention preferably adds texturing and aeration to the whipped product. By texturing it is meant dryness and firmness, a dry product being one that is not shiny and wet to the ultimate user. Preferably, a combination of emulsifiers is used, one to give aeration, and the second to give texture.

In a liquid whipped topping composition, a preferred combination of emulsifiers is about 0.2-1.0% ethoxylated monoglyceride to give aeration and a small amount, about 0.01-0.2%, of a polyoxyethylene fatty acid ester, preferably Polysorbate 80 (polyoxyethylene (20) sorbitan monooleate), to give texture. One suitable ethoxylated mono- and diglyceride is Santelle EOM (trademark, SCM Corporation), having a Capillary Melting Point of 80°-85° F., an HLB of 13.1 and a paste consistency. Only a small amount of the Polysorbate 80 need be employed, for instance about 0.05%, based on the entire weight of the liquid formulation, a greater amount adding off-flavor and excessive firmness to the liquid composition. The ratio of ethoxylated monoglyceride to Polysorbate 80 is preferably about 9:1, although other emulsifier combinations, and proportions, to provide the functions of aeration and texture will be apparent to those skilled in the art.

For instance, the emulsifier combination for a spray dried mix is somewhat different, since emulsifiers such as ethoxylated mono- and diglyceride and Polysorbate 80 are not as fat soluble. For a spray dried composition, it is preferable to employ emulsifiers having relatively low HLB's, and for this purpose, such emulsifiers as liquid partial glycerol esters, including glycerol monooleate, mono- and diglycerides, and propylene glycol partial esters; and glycerol lactoesters of fatty acids such as glycerol lactopalmitate, HLB 2.4, may be employed. One propylene glycol partial ester is propylene glycol lactostearate (PGLS), a specific such emulsifier being Durlac 300, HLB 2.4 (trademark, SCM Corporation). Another is propylene glycol monostearate (PGMS), a specific such ester being Durpro 107, HLB 2.2 (trademark, SCM Corporation). Glycerol monooleates, HLB about 2.8, available on the market are sold under the trademarks Emrite 6009 (trademark, Emery Industries), comprising mono- and diglycerides of food grade oleic acid said to have an iodine value of at least 60, at least 46% alpha-monoglyceride, less than 7% free glycerin and 9.5% propylene glycol; and Atmos 300 (trademark, ICI United States, Inc.) of similar composition said to contain about 12% propylene glycol. Glycerol lactoesters of fatty acids available on the market are Durlac 100 and Durlac 200 (trademarks, SCM Corporation). These are glycerol lactopalmitates and have Capillary Melting Points of 115°-130° F. and 97°-103° F., respectively. Suitable mono- and diglycerides are Dur-em 104 (HLB 2.8, I.V. 65-70, Capillary Melting Point 115°-121° F.) and Dur-em 117 (HLB 2.8, I.V. 5 max., Capillary Method Point 145°-150° F.) Dur-em 104 and Dur-em 117 are both trademarks of SCM Corporation. A suitable mixture of emulsifiers in the preparation of a spray dried mix comprises about 5% Dur-em 104, a soft mono-diglyceride, for optimum dryness and stiffness; and about 0.35% Dur-em 117, a hard mono-diglyceride (these percentages being on a dry basis), for aeration or overrun.

Broadly the ethoxylated fatty acid esters useful in the composition of the present invention are the fatty acid esters of glycerol, hexitol, hexitan and isohexide. A preferred class of ethoxylated fatty acid esters are the ethoxylated mono- and diglycerides, which are the polyethoxylated fatty acid esters of glycerol, and may be conveniently described as a mixture of stearate, palmitate, and lesser amounts of myristate partial esters of glycerin condensed with about 18 to 22 moles, preferably about 20 moles, of ethylene oxide per mole of α-monoglyceride reaction mixture, for instance as set forth in Egan U.S. Pat. No. 3,433,645. The fatty acid radicals of ethoxylated monoglycerides preferably are higher fatty acid chains having about 12 to 18 carbon atoms. Representative fatty acid mono- and diesters of glycerin from which the ethoxylated monoglycerides are derived are glycerol monostearate, glycerol distearate, glycerol monopalmitate, glycerol dipalmitate, glycerol monooleate, glycerol dioleate and others.

Santelle EOM, mentioned above, is manufactured from hydrogenated vegetable oils and has an acid value maximum of 2.0, an hydroxyl value of 60-80, an I.V. number based on fatty acid content of 3 maximum and an oxyethylene content of 60.5-65.0%. Preferably, the ethoxylated monoglycerides for this invention have a hydroxyl value of about 65 to 80, a saponification number of about 60 to 80, acid values less than about 2 and an oxyethylene content of about 60 to 65 weight percent based on the total ethoxylated glycerides composition. The Capillary Melting Point of ethoxylated mono- and diglycerides is between about 75 to 95° F. and preferably between about 80° to 90° F. Ethoxylated monoglycerides may be prepared by reacting ethylene oxide with a mono- and diglyceride mixture at temperatures of about 145° to 175° C., such as suggested in the Egan U.S. Pat. No. 3,490,918.

In place of the ethoxylated monoglycerides, the combination of the present invention can contain polyoxyethylene-containing fatty acid esters such as Polysorbate 60 (polyoxyethylene (20) sorbitan monostearate, sold under the trademark Durfax 60, SCM Corporation). Other such polysorbates useful in the composition of the present invention are polyoxyethylene sorbitol distearate, polyoxyethylene sorbitan monostearate, polyoxyethylene isosorbide dipalmitate and polyoxyethylene sorbital distearate.

EXAMPLE 1

This example concerns a liquid composition in accordance with the concepts of the present invention which has significantly less calories than available natural products. The composition employed is as follows:

Table 1

| Ingredient | Percent |
| --- | --- |
| Sodium caseinate | 2.00 |
| Avicel RC 581 | 1.00 |
| Carrageenan (Gelcarrin MMR) | 0.05 |
| 36 D.E. corn syrup solids | 20.00 |
| Hydrogenated palm kernel oil | 9.00 |
| Santelle EOM (ethoxylated monoglyceride) | 0.45 |
| Durfax 80 (Polysorbate 80) | 0.05 |
| Water | Balance |
| Total | 100.00 |

The above composition may be sold in liquid form. It is capable of being whipped, employing a household type mixer, in 5 to 10 minutes, producing an overrun of 150 to 300%. Eating qualities (organoleptic properties) were good, the composition leaving no mouth film. The composition had good firmness, following whipping, with good shape holding properties and good freeze-thaw stability.

The caloric content of the whipped topping composition was about 174 calories per 100 grams, which is about 50% of the caloric content of a 36% butterfat whipping cream without added sugar.

EXAMPLE 2

This example illustrates the preparation of a spray dried formulation in accordance with the concepts of the present invention. For the purpose of improving drying, and functional properties of the spray dried product, including mixing and whipping time, 50% of the total sugar was withheld from the formulation to be spray dried, along with some of the minor ingredients employed to improve flavor and functional properties. Thus the following formulation was spray dried:

Table 2

| Ingredient | Percent |
| --- | --- |
| Sodium caseinate | 7.71 |
| Avicel RC 581 | 2.90 |
| Gelcarrin MMR | 0.19 |
| Sugar | 19.28 |
| 36 D.E. corn syrup solids | 37.57 |
| Paramount C | 27.00 |
| Dur-em 104 | 5.00 |
| Dur-em 117 | 0.35 |
| Total | 100.00 |

The above whipped topping base was blended with the following ingredients to prepare the dried topping formulation:

Table 3

| Ingredient | Percent |
| --- | --- |
| Topping base | 90.42 |
| Sugar | 8.50 |
| Avicel RC 581 | 0.66 |
| Salt | 0.21 |

Table 3-continued

| Ingredient | Percent |
| --- | --- |
| Vanillin | 0.21 |
| Total | 100.00 |

For reconstitution, the above dry topping mix was mixed with water and vanilla extract in the proportions as follows: 69.94% water, 1.05% vanilla extract, and 29.01% of the topping mix. Whipping time was carried out in three minutes producing a product having a specific gravity of 0.33.

It is understood that the compositions of the present invention can employ additional ingredients such as colorings and flavorings; e.g., fruits, syrups, cocoa, and chocolate. Known whipping agents can be added to the compositions of the present invention such as Marvic acid* (trademark, SCM Corporation); sorbitan esters, such as sorbitan monostearate; polyglycerol esters; and whipping agents purchasable on the market. Other ingredients, known to those skilled in the art, can be employed.

*Lactylic esters of fatty acids.

What is claimed is:

1. A whippable fluid topping composition capable of direct use having a caloric content not substantially greater than about 170–180 calories per 100 grams and freeze-thaw stability, for producing a stable whipped topping, comprising on a wet basis
   a normally water-dispersible or soluble protein about 1 to 5% by weight
   stabilizing gum about 0.20 to 2.2% by weight
   sweetener about 15 to 25% by weight
   high solids fat about 8 to 10% by weight
   ethoxylated mono- and diglyceride about 0.20 to 1.0% by weight
   polyoxyethylene sorbitan fatty acid ester about 0.01 to 0.2% by weight
wherein said fat is a high solids fat having a WMP in the range of about 90° F. to about 115° F. and an approximate SFI of about

| Temperature, °F. | Approximate Solid-Fat Index |
| --- | --- |
| 50 | 69 ± 10 |
| 70 | 60 ± 12 |
| 80 | 39 ± 14 |
| 92 | 14 ± 8 |
| 100 | 11 max. | the remainder being essentially water.

2. The composition of claim 1 wherein said protein is sodium caseinate, said polyoxyethylene containing fatty acid ester being polyoxyethylene (20) sorbitan monooleate.

3. The composition of claim 1 wherein said stabilizing gum is a mixture of microcrystalline cellulose and cellulose gum.

4. The composition of claim 1 wherein said sweetener is selected from the group consisting of sugar, corn syrup solids, and mixtures thereof.

5. A spray dried base composition for admixture with water to provide a whippable topping composition for producing a stable whipped topping comprising on a dry basis
   normally water-dispersible or soluble protein about 5 to 10by weight
   stabilizing gum about 2 to 4% by weight
   sweetener about 50 to 70% by weight
   high solids fat about 25 to 35% by weight
   soft mono-diglyceride about 3 to 8% by weight
   hard mono-diglyceride about 0.1 to 1% by weight
   said high solids fat having a Wiley Melting Point in the range of about 90° F. to about 115° F. and an approximate solid-fat index of

| Temperature, °F. | Approximate Solid-Fat Index |
| --- | --- |
| 50 | 69 ± 10 |
| 70 | 60 ± 12 |
| 80 | 39 ± 14 |
| 92 | 14 ± 8 |
| 100 | 11 max. |

6. A liquid topping composition prepared from the composition of claim 18 by dry blending said composition with additional sweetener and minor amounts of other ingredients to produce a topping mix and then mixing said topping mix with a solution which is essentially water, said liquid topping composition consisting essentially of about 20 to about 40% of the composition of claim 5, about 6–10% additional sweetener, and about 60–80% water.

* * * * *